(12) United States Patent
Ono

(10) Patent No.: US 10,909,702 B2
(45) Date of Patent: Feb. 2, 2021

(54) INSPECTION DEVICE

(71) Applicant: Keyence Corporation, Osaka (JP)

(72) Inventor: Shuhei Ono, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/727,961

(22) Filed: Dec. 27, 2019

(65) Prior Publication Data

US 2020/0258246 A1 Aug. 13, 2020

(30) Foreign Application Priority Data

Feb. 8, 2019 (JP) .................... 2019-021810

(51) Int. Cl.
*G06T 7/521* (2017.01)
*G01B 11/25* (2006.01)
*G06T 15/04* (2011.01)

(52) U.S. Cl.
CPC .......... *G06T 7/521* (2017.01); *G01B 11/2518* (2013.01); *G06T 15/04* (2013.01); *G06T 2207/10028* (2013.01)

(58) Field of Classification Search
CPC ................ G01B 11/2518; G06T 15/04; G06T 2207/10028; G06T 7/521
USPC .................................................. 356/600–640
See application file for complete search history.

(56) References Cited

U.S. PATENT DOCUMENTS

| 9,404,739 B2 | 8/2016 | Nakatsukasa | |
| 2002/0067474 A1* | 6/2002 | Uomori | G01S 17/42 356/3.01 |
| 2016/0003613 A1* | 1/2016 | Atiya | A61B 5/4547 356/612 |

FOREIGN PATENT DOCUMENTS

JP 2006284215 A 10/2006

OTHER PUBLICATIONS

U.S. Appl. No. 16/727,957, filed Dec. 27, 2019 (71 pages).
U.S. Appl. No. 16/727,960, filed Dec. 27, 2019 (61 pages).

* cited by examiner

*Primary Examiner* — Tri T Ton
(74) *Attorney, Agent, or Firm* — Kilyk & Bowersox, P.L.L.C.

(57) ABSTRACT

An imaging part 120 receives the light that is reflected from the measurement target, and a plurality of pieces of pattern image data are generated. Height data is generated on the basis of the plurality of pieces of the pattern image data. Green light, blue light, and red light are successively emitted from the light sources 111 to 113, and are reflected from the pattern generating part 118, and uniform light of the green light, uniform light of the blue light, and uniform light of the red light are successively projected onto the measurement target. The imaging part 120 receives the uniform light reflected by the measurement target, and a plurality of pieces of texture image data are successively generated. The plurality of pieces of the texture image data are synthesized, whereby color texture image data is generated.

4 Claims, 8 Drawing Sheets

INSPECTION DEVICE

CROSS-REFERENCE TO RELATED APPLICATIONS

The present application claims foreign priority based on Japanese Patent Application No. 2019-021810, filed Feb. 8, 2019, the contents of which is incorporated herein by reference.

BACKGROUND OF THE INVENTION

1. Field of the Invention

The present invention relates to an inspection device that inspects the height of a measurement target.

2. Description of Related Art

In an inspection device of a triangulation method, a light projecting part irradiates a surface of a measurement target with light, and a light receiving part including one-dimensionally or two-dimensionally arranged pixels receives the reflected light. Height data indicating a height image of the measurement target is generated on the basis of data on a received light amount distribution that is obtained by the light receiving part. Such height data is used in order to inspect (in-line inspect) the height of produced measurement targets in production sites such as factories in some cases.

Meanwhile, in the abovementioned inspection device, in addition to the height data, if texture image data indicating an image of the measurement target can be acquired, it is possible to grasp more information on the measurement target.

For example, in an inspection device described in JP-A-2006-284215, in a state where a three-dimensional measurement irradiation unit irradiates a measurement target with three-dimensional measurement light, the measurement target is imaged by a charge coupled device (CCD) camera. Three-dimensional data on the measurement target is generated on the basis of image data to be acquired by this imaging. Moreover, in the inspection device, in a state where a two-dimensional imaging irradiation unit irradiates the measurement target with imaging light, the measurement target is imaged by the CCD camera. Two-dimensional data indicating a surface of the measurement target is generated on the basis of image data to be acquired by this imaging.

The two-dimensional data is mapped with respect to the three-dimensional data, whereby height image including light and shade information is displayed on a display unit.

The height image displayed in this manner makes it easy to grasp the textures and the reality of the measurement target.

In order to use the inspection device described in JP-A-2006-284215 for the inspection of a measurement target flowing on a belt conveyor, for example, an installation space of the three-dimensional measurement irradiation unit, the two-dimensional imaging irradiation unit, and the CCD camera need to be secured above the belt conveyor. In this case, downsizing of the inspection device is desired for improving the flexibility of layout of the inspection device.

Moreover, in the abovementioned inspection device, the imaging for acquiring the three-dimensional data and the imaging for acquiring the two-dimensional data are individually performed using the mutually different two irradiation units. Accordingly, there is a possibility that a difference in irradiation possible regions on the surface of the measurement target may occur between one of the irradiation units and the other irradiation unit. In this case, an unmeasurable region in the generated three-dimensional data does not match with an unmeasurable region in the two-dimensional data. This makes it difficult to grasp accurate information on the shape and the surface state of the measurement target.

SUMMARY OF THE INVENTION

An object of the present invention is to provide an inspection device that makes it easy to accurately grasp the shape and the surface state of a measurement target while implementing downsizing thereof.

(1) An inspection device according to the present invention is provided with: a plurality of light sources configured to be provided so as to respectively emit a plurality of pieces of light having mutually different wavelengths, and so as to cause the emitted plurality of pieces of the light to progress in a preset common optical path; a pattern generating part that is provided on the common optical path, and configured to receive the light progressing in the common optical path, and selectively generate structured light and uniform light on the basis of the received light so as to cause the generated structured light or uniform light to progress in the common optical path, and to be projected onto a measurement target; a light projection control part configured to cause light to emit from at least one light source among the plurality of the light sources, control the plurality of the light sources and the pattern generating part so as to generate a plurality of pieces of the structured light while shifting a phase using the light emitted from the at least one light source, and control the plurality of the light sources and the pattern generating part so as to successively generate a plurality of pieces of the uniform light respectively having the plurality of the wavelengths from the plurality of the light sources; an imaging part configured to successively generate, by successively receiving the plurality of pieces of the structured light reflected from the measurement target, a plurality of pieces of pattern image data indicating an image of the measurement target, and successively generate, by successively receiving the plurality of pieces of the uniform light reflected from the measurement target, a plurality of pieces of texture image data indicating the image of the measurement target; an image data generating part configured to generate, on the basis of the plurality of pieces of the pattern image data, height data indicating a height image of the measurement target, and generate, by synthesizing the plurality of pieces of the texture image data, color texture image data indicating the image of the measurement target with a plurality of colors corresponding to the plurality of wavelengths; and an inspecting part configured to execute, on the basis of the height data and the color texture image data, an inspection of the measurement target.

In the inspection device, light is emitted from at least one light source among the plurality of the light sources. The emitted at least one light enters the pattern generating part, whereby the measurement target is successively irradiated by the plurality of pieces of the structured light that are generated while shifting a phase. In this process, the imaging part successively receives the plurality of pieces of the structured light reflected from the measurement target, and a plurality of pieces of pattern image data are successively generated. Height data is generated on the basis of the generated plurality of pieces of the pattern image data.

Moreover, the plurality of pieces of the light having mutually different wavelengths are successively emitted from the plurality of the light sources, and enter the pattern generating part. Therefore, the measurement target is successively irradiated by the plurality of pieces of the uniform light having mutually different wavelengths from the pattern generating part. The imaging part successively receives the plurality of pieces of the uniform light reflected from the measurement target, and a plurality of pieces of texture image data are successively generated. The generated plurality of pieces of the texture image data are synthesized, whereby color texture image data is generated. An inspection of the measurement target is executed on the basis of the height data and the color texture image data.

In this case, the pattern generating part and the imaging part are commonly used in order to generate height data and color texture image data. Therefore, the configuration for generating height data and the configuration for generating color texture image data do not need to be individually prepared. Specifically, a light projection system that irradiates the measurement target with structured light and a light projection system that irradiates the measurement target with uniform light do not need to be individually prepared. Moreover, a light reception system that receives structured light reflected from the measurement target and a light reception system that receives uniform light reflected from the measurement target do not need to be individually prepared. This can reduce the number of components in the plurality of the light projection and reception systems for generating height data and color texture image data. This allows the reduction in size and the reduction in cost of the inspection device.

Moreover, with the abovementioned configuration, the structured light that is used in the generation of height data and the uniform light that is used in the generation of color texture image data progress in the common optical path, and are projected onto the measurement target. Therefore, no difference of a region such as a shadow to be formed on the measurement target is generated between at the generation of height data and at the generation of color texture image data. Accordingly, the unmeasurable region in the height data and the unmeasurable region in the color texture image data are maintained while being matched with each other. As a result, on the basis of the height data and the color texture image data, it is possible to easily grasp accurate information on the shape and the surface state of the measurement target.

(2) The plurality of the light sources may include the light source that emits green light, the light source that emits blue light, and the light source that emits red light, and the light projection control part may control the plurality of the light sources and the pattern generating part so as to cause the green light, the blue light, and the red light to be emitted from the plurality of the light sources, and to generate the plurality of pieces of the structured light while shifting a phase using white light that is obtained from the green light, the blue light, and the red light having been emitted.

Depending on the color of the measurement target, if light having a specified wavelength is projected onto the measurement target, the projected light is absorbed on a surface of the measurement target in some cases. In this case, even if the plurality of pieces of the structured light are projected onto the measurement target, there is a possibility that height data is not acquired due to the small amount of structured light that is reflected in the measurement target.

With the abovementioned configuration, when height data is generated, the plurality of pieces of the structured light of white including components of a plurality of wavelengths are projected onto the measurement target. Therefore, independent of the color of the measurement target, at least a part of the components of the wavelength can be reflected on the surface of the measurement target. As a result, height data can be generated in an enlarged range on the measurement target.

(3) The inspection device is further provided with: a light reception optical system configured to include a light reception lens having an optical axis that extends in an up-and-down direction, and guides structured light or uniform light that is reflected upward from the measurement target, to the imaging part; a holding member configured to hold the plurality of the light sources so as to cause the plurality of pieces of the light that are respectively emitted from the plurality of the light sources to progress in the common optical path from an upward direction to a downward direction; and a reflecting member configured to reflect the plurality of pieces of the light that are respectively emitted from the plurality of the light sources and progress from the upward direction to the downward direction, in an obliquely upward direction, so as to move away from the optical axis of the light reception lens, in which the pattern generating part may include a light generation surface that selectively generates structured light and uniform light, by reflecting at least a part of the plurality of pieces of the light reflected by the reflecting member in an obliquely downward direction so as to come closer to the optical axis of the light reception lens.

In this case, each of the plurality of pieces of the light that are emitted from the plurality of the light sources held by the holding member progresses in the common optical path from the upward direction to the downward direction, and is reflected in the obliquely upward direction by the reflecting member so as to move away from the optical axis of the light reception lens. At least a part of the light reflected by the reflecting member is reflected by the light generation surface in the obliquely downward direction so as to come closer to the optical axis of the light reception lens. In this process, the light reflected in the light generation surface is projected onto the measurement target as structured light or uniform light. The structured light or the uniform light that is reflected upward from the measurement target enters the imaging part through the light reception optical system.

With the abovementioned configuration, the optical path common to the plurality of pieces of the light is bent. This prevents the configuration for irradiating the measurement target with the structured light and the uniform light from upsizing in an irradiation direction thereof. Moreover, with the abovementioned configuration, in a direction orthogonal to the optical axis of the light reception optical system, the plurality of the light sources, the holding member, and the reflecting member are located between the pattern generating part and the optical axis of the light reception optical system. Therefore, it is possible to effectively use a space between the pattern generating part and the optical axis of the light reception optical system, in the direction orthogonal to the optical axis of the light reception optical system.

Accordingly, the configuration of the plurality of the light projection and reception systems including the plurality of the light sources, the holding member, the reflecting member, the pattern generating part, the light reception optical system, and the imaging part can be further downsized.

(4) The inspection device is further provided with a light projection optical system configured to include a light projection lens having an optical axis that extends obliquely downward so as to come closer to the optical axis of the light reception lens, and guides the structured light or the uniform light generated with the light generation surface, to the measurement target, in which the measurement target may be placed on a preset placement surface, and the pattern generating part and the light projection optical system may be arranged so as to cause the light generation surface of the pattern generating part and the placement surface to follow a Scheimpflug principle, relative to a principal plane of the light projection optical system.

In this case, the structured light or the uniform light generated in the light generation surface is projected onto the measurement target through the light projection optical system. Here, the light generation surface of the pattern generating part and the placement surface follow the Scheimpflug principle, relative to the principal plane of the light projection optical system, so that it is possible to focus the focal point of the entire light generation surface on the placement surface. Accordingly, even when the light projection lens has a small f value, the focal point of the entire light generation surface is focused on the placement surface, so that it is possible to design the illumination to be brighter.

(5) The inspection device may further be provided with a casing configured to accommodate the plurality of the light sources, the holding member, the reflecting member, the pattern generating part, the light projection optical system, the light reception optical system, and the imaging part.

In this case, it is possible to compactly accommodate the plurality of the light projection and reception systems including the plurality of the light sources, the holding member, the reflecting member, the pattern generating part, the light projection optical system, the light reception optical system, and the imaging part, within the casing. This can downsize the casing, and can reduce an installation space for the casing. In addition, the handling such as the installation of the inspection device becomes easy.

According to the present invention, downsizing of the inspection device is implemented, and accurate grasping of the shape and the surface state of the measurement target becomes easy.

DESCRIPTION OF EMBODIMENTS

An inspection device according to one embodiment of the present invention is explained below with reference to the drawings.

(1) Configuration of Inspection Device

Figure 1:
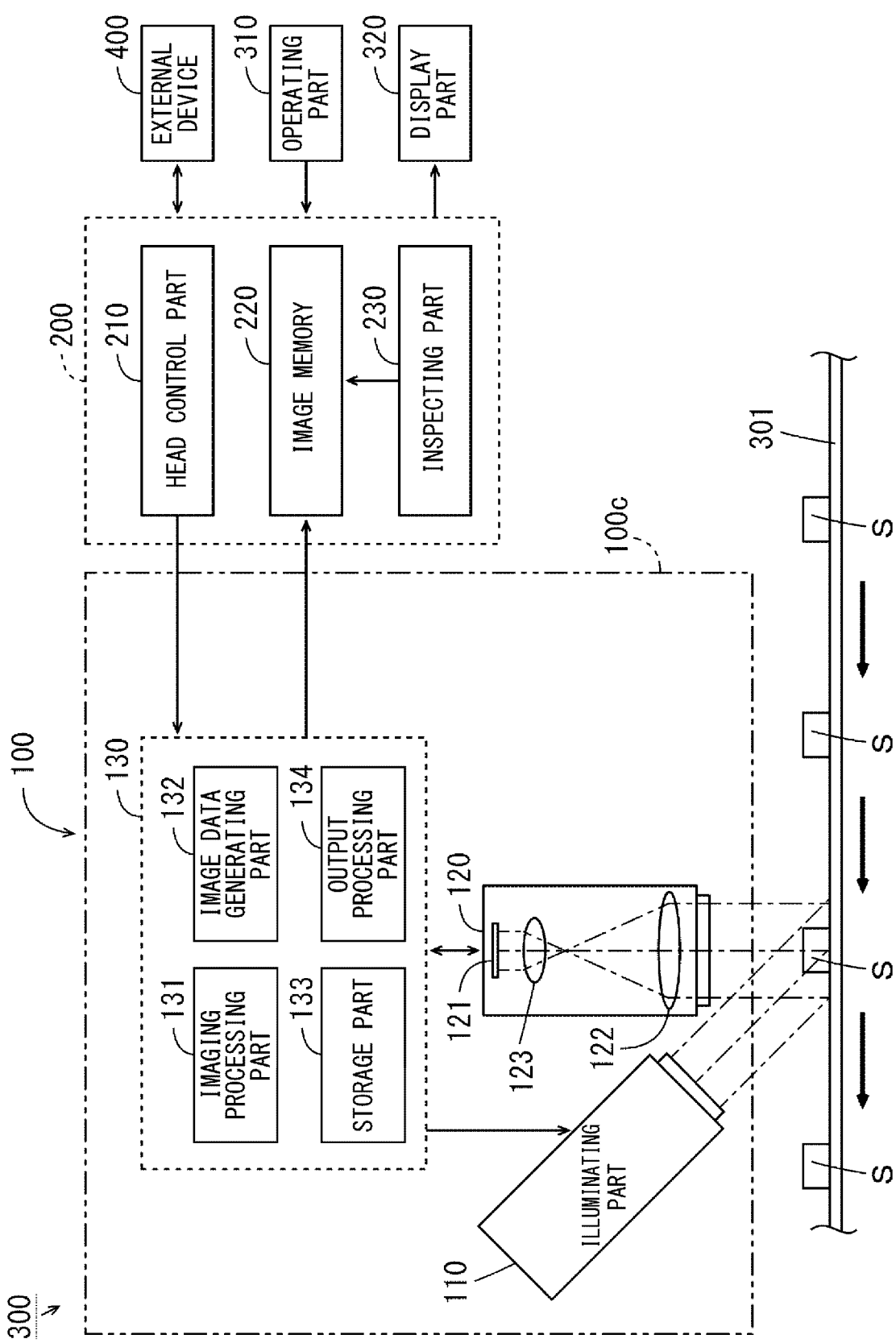
FIG. 1 is a block diagram illustrating a configuration of an inspection device according to one embodiment of the present invention.

FIG. 1 is a block diagram illustrating a configuration of an inspection device according to one embodiment of the present invention. As illustrated in FIG. 1, an inspection device 300 is provided with a head part 100, a controller part 200, an operating part 310, and a display part 320. The controller part 200 is connected to an external device 400 such as a programmable logic controller.

As thick arrows illustrate in FIG. 1, a plurality of measurement targets S are successively conveyed by a belt conveyor 301 so as to pass through a space below the head part 100. When each of the measurement targets S passes through the space below the head part 100, the belt conveyor 301 stops in a certain period of time such that the relevant measurement target S temporarily halts at a prescribed position below the head part 100.

The head part 100 is, for example, a light-emitting and light-receiving integrated imaging device, and has a configuration in which an illuminating part 110, an imaging part 120, and a computing part 130 are accommodated in a head casing 100c. The illuminating part 110 is configured to allow selective irradiation of light between the light of red, blue, green, or white that has an arbitrary pattern, and the light of red, blue, green, or white that has no pattern and is uniform, to the measurement target S from an obliquely upward direction. Hereinafter, the light that has an arbitrary pattern is referred to as structured light, and light that is uniform is referred to as uniform light. The configuration of the illuminating part 110 is described later.

The imaging part 120 includes an imaging element 121, and light reception lenses 122 and 123. At least the light reception lens 122 in the light reception lenses 122 and 123 is a telecentric lens. The structured light or the uniform light reflected upward by the measurement target S is condensed and image-formed by the light reception lenses 122 and 123 of the imaging part 120, and is thereafter received by the imaging element 121. The imaging element 121 is, for example, a monochrome charge coupled device (CCD), and outputs analog electric signals corresponding to the light receiving amount from respective pixels, thereby generating image data. The imaging element 121 may be another imaging element such as a complementary metal oxide semiconductor (CMOS) image sensor.

In the present embodiment, image data indicating an image of the measurement target S when the measurement target S is irradiated with structured light is referred to as pattern image data. Meanwhile, image data indicating an image of the measurement target S when the measurement target S is irradiated with uniform light having a wavelength of any of red, blue, or green is referred to as texture image data.

The computing part 130 is implemented by a field programmable gate array (FPGA), for example, and includes an imaging processing part 131, an image data generating part 132, a storage part 133, and an output processing part 134. In the present embodiment, the computing part 130 is implement by an FPGA, but the present invention is not limited thereto. The computing part 130 may be implemented by a central computing processing device (CPU) and a random access memory (RAM), or may be implemented by a micro computer.

The imaging processing part 131 controls operations of the illuminating part 110 and the imaging part 120. The image data generating part 132 generates, on the basis of a plurality of pieces of pattern image data, height data indicating a height image of the measurement target S. Moreover, by synthesizing texture image data of red, blue, and green generated from the uniform light of red, blue, and green, the image data generating part 132 generates color texture image data indicating a color image of the measurement target S. The storage part 133 temporarily stores therein the plurality of pieces of pattern image data and the plurality of pieces of the texture image data generated by the imaging part 120. Moreover, the storage part 133 temporarily stores therein the height data and the color texture image data generated by the image data generating part 132. The output processing part 134 outputs the height data or the color texture image data stored in the storage part 133. Details of the computing part 130 are described later.

The controller part 200 includes a head control part 210, an image memory 220, and an inspecting part 230. The head control part 210 controls an operation of the head part 100, on the basis of a command given by the external device 400. The image memory 220 stores therein the height data or the color texture image data output by the computing part 130.

The inspecting part 230 executes processing, such as edge detection or size measurement, with respect to the height data or the color texture image data stored in the image memory 220, on the basis of an inspection content specified by a user. Moreover, the inspecting part 230 determines the quality of the measurement target S by comparing a measured value with a prescribed threshold, and provides a determination result to the external device 400.

The operating part 310 and the display part 320 are connected to the controller part 200. The operating part 310 includes a key board, a pointing device, or a dedicated console. As a pointing device, a mouse, a joystick, or the like is used. The user can specify a desired inspection content to the controller part 200 by operating the operating part 310.

The display part 320 includes, for example, a liquid crystal display (LCD) panel or an organic electroluminescent (EL) panel. The display part 320 displays a height image based on the height data stored in the image memory 220. Moreover, the display part 320 displays a color image of the measurement target S based on the color texture image data stored in the image memory 220. In addition, the display part 320 displays the determination result of the measurement target S by the inspecting part 230.

(2) Basic Inner Structure of Head Part 100

Figure 2:
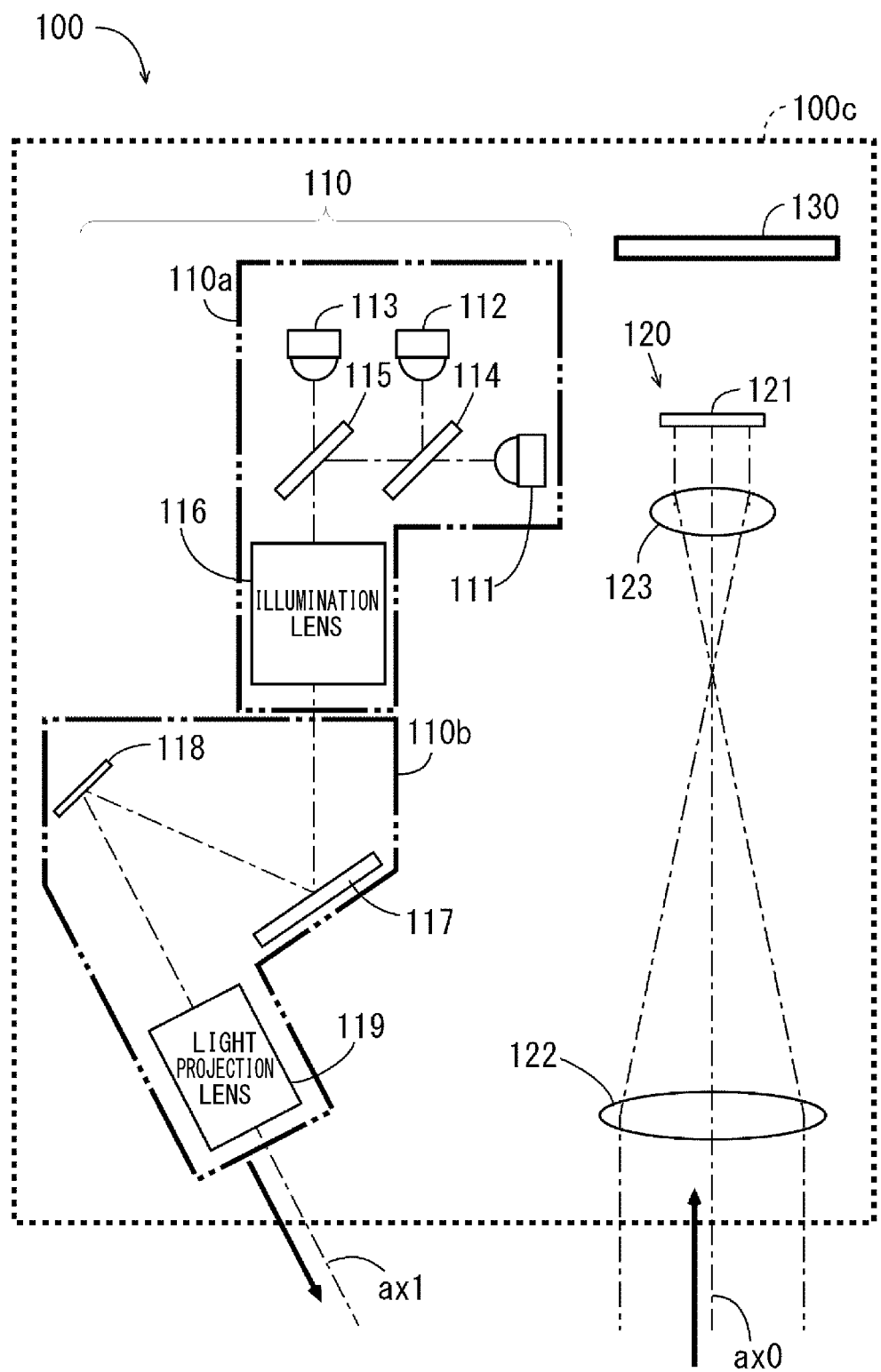
FIG. 2 is a schematic diagram for explaining a basic inner structure of a head part in FIG. 1.

FIG. 2 is a schematic diagram for explaining a basic inner structure of the head part 100 in FIG. 1. As illustrated in FIG. 2, the imaging part 120 is fixed in an inside of the head casing 100*c* such that a common optical axis ax0 of the light reception lenses 122 and 123 extends in an up-and-down direction. The imaging element 121 is fixed above the light reception lenses 122 and 123 so as to receive light that progresses in the common optical axis ax0 of the light reception lenses 122 and 123 from a downward direction to an upward direction. Moreover, in the present example, the computing part 130 in a state of being mounted to a substrate is fixed inside the head casing 100*c* so as to locate above the imaging part 120.

Inside the head casing 100*c*, the illuminating part 110 is provided so as to be adjacent to the imaging part 120 in the horizontal direction. The illuminating part 110 includes light sources 111, 112, and 113, dichroic mirrors 114 and 115, an illumination lens 116, a mirror 117, a pattern generating part 118, a light projection lens 119, a first holding member 110*a*, and a second holding member 110*b*.

The first holding member 110*a* integrally holds the light sources 111, 112, and 113, the dichroic mirrors 114 and 115, and the illumination lens 116. The second holding member 110*b* integrally holds the mirror 117, the pattern generating part 118, and the light projection lens 119. The first holding member 110*a* is connected to the second holding member 110*b* so as to be located above the second holding member 110*b*. The first holding member 110*a* and the second holding member 110*b* being connected to each other are fixed inside the head casing 100*c* so as to have a certain positional relationship with the imaging part 120.

The light sources 111, 112, and 113 are, for example, light emitting diodes (LEDs), and respectively emit green light, blue light, and red light. Each of the light sources 111 to 113 may be a light source other than the LED.

The dichroic mirror 114 is held by the first holding member 110*a* so as to cause the green light emitted by the light source 111 and the blue light emitted by the light source 112 to be superimposed on each other. The dichroic mirror 115 is held by the first holding member 110*a* so as to cause the light superimposed by the dichroic mirror 114 and the red light emitted by the light source 113 to be superimposed on each other. Accordingly, the green light, the blue light, and the red light, which are simultaneously emitted from the light sources 111 to 113, are superimposed on one another on a common optical path, whereby white light is generated.

Moreover, in the present embodiment, the light sources 111 to 113 and the dichroic mirrors 114 and 115 are held by the first holding member 110*a* such that a plurality of pieces of light that are respectively emitted by the light sources 111 to 113 progress in the common optical path from the upward direction to the downward direction.

The illumination lens 116 is held by the first holding member 110*a* at a position below the dichroic mirror 115 so as to condense light passed through or reflected from the dichroic mirror 115. Inside the head casing 100*c*, the light condensed by the illumination lens 116 further progresses from the upward direction to the downward direction.

The mirror 117 is held by the second holding member 110*b* so as to reflect the light passed through the illumination lens 116 in an obliquely upward direction while keeping the light away from the optical axis ax0 of the imaging part 120. The pattern generating part 118 is held by the second holding member 110*b* so as to receive the light reflected by the mirror 117. The pattern generating part 118 is, for example, a digital micro-mirror device (DMD), and includes a light generation surface that reflects at least a part of the received light in an obliquely downward direction so as to come closer to the optical axis ax0 of the imaging part 120, thereby selectively generating structured light and uniform light. The pattern generating part 118 may be an LCD or a reflective liquid crystal element (LCOS).

The light projection lens 119 is held by the second holding member 110*b* such that an optical axis ax1 of the light projection lens 119 extends obliquely downward while coming closer to the optical axis ax0 of the imaging part 120. In the present embodiment, the light projection lens 119 irradiates the measurement target S in FIG. 1 with light from the pattern generating part 118 while extending the light. Note that, the light projection lens 119 may contain a telecentric optical system, and may be configured to extend and make structured light or uniform light parallel from the pattern generating part 118, and to allow irradiation of the structured light or the uniform light, to the measurement target S.

With the abovementioned configuration, the optical path common to the plurality of pieces of light that are emitted from the light sources 111, 112, and 113 is bent, and the measurement target S is irradiated with the light on the optical path. Therefore, the respective optical systems that are held by the first holding member 110a do not align on the optical axis ax1 of the light projection lens 119 that is held by the second holding member 110b. This prevents the configuration for irradiating the measurement target S with the structured light and the uniform light from upsizing in the irradiation direction thereof.

Moreover, with the abovementioned configuration, in a direction orthogonal to the optical axis ax0 of the imaging part 120, the respective optical systems that are held by the first holding member 110a are located between the pattern generating part 118 and the optical axis ax0 of the imaging part 120. Therefore, it is possible to effectively use a space between the pattern generating part 118 and the optical axis ax0 of the imaging part 120, in the direction orthogonal to the optical axis ax0 of the imaging part 120. Accordingly, the compact arrangement of the illuminating part 110 and the imaging part 120 inside the head casing 100c implements the downsizing of the head part 100, and improves the flexibility of layout of the head part 100.

The imaging processing part 131 of the computing part 130 in FIG. 1 individually controls the emission of light from the light sources 111 to 113 in accordance with a flow of inspection processing, which is described later. Moreover, the imaging processing part 131 controls the pattern generating part 118 such that a desired pattern is assigned to the light emit from the illuminating part 110. With this control, the illuminating part 110 selectively emits structured light of white including a prescribed pattern, and uniform light of green, blue, or red. In addition, the imaging processing part 131 controls the imaging part 120 so as to image the measurement target S in synchronization with the emission of the structured light or the uniform light in the illuminating part 110, in accordance with the flow of the inspection processing, which is described later.

(3) Generation of Height Data

In the inspection device 300, a unique three-dimensional coordinate system (hereinafter, referred to as a device coordinate system) is defined to the head part 100. The device coordinate system in this example includes an origin point, and X axis, a Y axis, and a Z axis that are orthogonal to one another. In the following explanation, a direction parallel to the X axis of the device coordinate system is referred to as an X direction, a direction parallel to the Y axis thereof is referred to as a Y direction, and a direction parallel to the Z axis thereof is referred to as a direction Z. The X direction and the Y direction are orthogonal to each other in a plane parallel to a top face (hereinafter, referred to as reference plane) of the belt conveyor 301. The Z direction is orthogonal to the reference plane.

Figure 3:
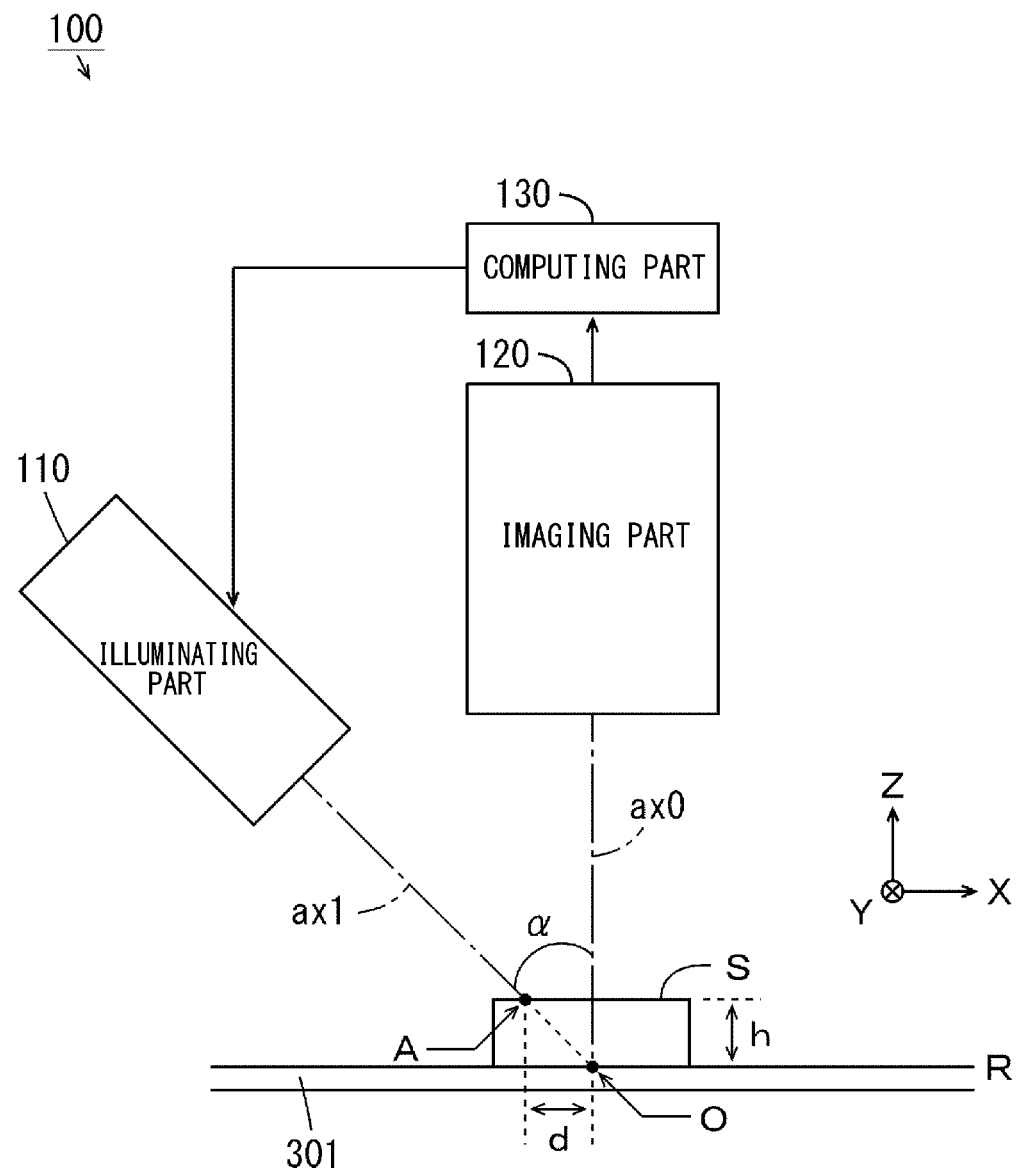
FIG. 3 is a diagram for explaining a principle of a triangulation method.

In the head part 100, height data indicating a height image of the measurement target S is generated by the triangulation method. FIG. 3 is a diagram for explaining a principle of the triangulation method. In FIG. 3, the X direction, the Y direction, and the Z direction are respectively illustrated as arrows. As illustrated in FIG. 3, an angle α between the optical axis ax1 of the optical system (the light projection lens 119 in FIG. 2) in the illuminating part 110 and the optical axis ax0 of the optical system (the light reception lenses 122 and 123 in FIG. 2) in the imaging part 120 is set in advance. The angle α is larger than 0 degree and smaller than 90 degrees.

When no measurement target S is present below the head part 100, the light that is emitted from the illuminating part 110 is reflected by a point O on a reference plane R, and enters the imaging part 120. In contrast, when the measurement target S is present below the head part 100, the light that is emitted from the illuminating part 110 is reflected by a point A on a surface of the measurement target S, and enters the imaging part 120. This causes the measurement target S to be imaged, and image data indicating an image of the measurement target S to be generated.

When a distance between the point O and the point A in the X direction is set as d, a height h of the point A in the measurement target S relative to the reference plane R is given by $h=d \div \tan(\alpha)$. The computing part 130 calculates the distance d on the basis of the image data generated by the imaging part 120. Moreover, the computing part 130 calculates the height h of the point A on the surface of the measurement target S, on the basis of the calculated distance d. By calculating heights of all the points on the surface of the measurement target S, it is possible to identify coordinates, which are indicated by the device coordinate system, for all the points to which the light has been irradiated. With the identification, height data of the measurement target S is generated.

In order to irradiate all the points on the surface of the measurement target S with light, various types of structured light are emitted from the illuminating part 110. In the present embodiment, the illuminating part 110 emits, a plurality of times, striped structured light (hereinafter, referred to as striped light) having linear cross-sections that are parallel to the Y direction and arranged in the X direction while a spatial phase thereof being changed. Moreover, the illuminating part 110 emits, a plurality of times, coded structured light (hereinafter, referred to as coded light) having linear cross-sections that are parallel to the Y direction and having bright portions and dark portions being arranged in the X direction, while the bright portions and the dark portions being changed to gray coded portions.

(4) Inspection Processing

Figure 4:
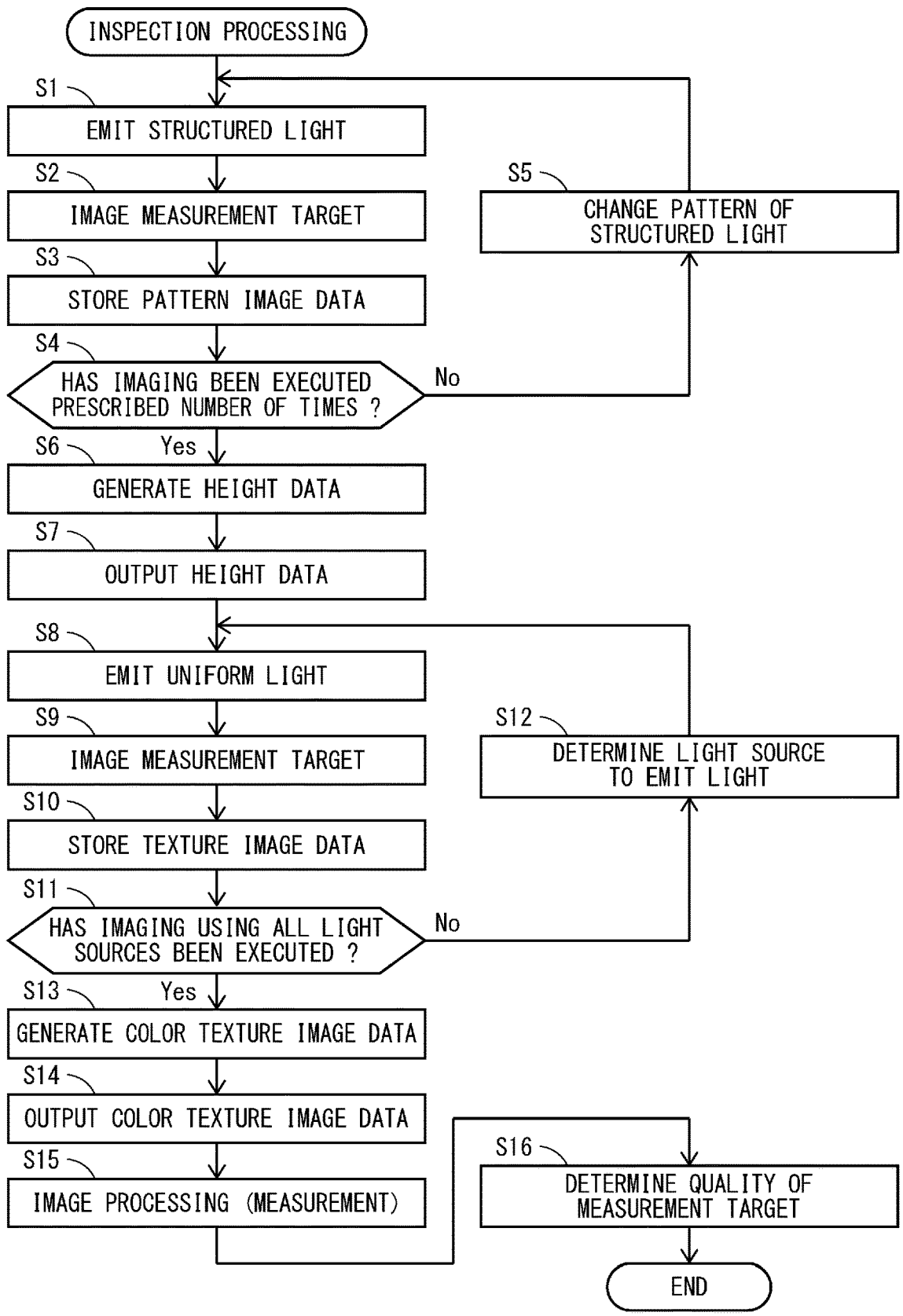
FIG. 4 is a flowchart illustrating one example of inspection processing that is executed by the inspection device in FIG. 1.

FIG. 4 is a flowchart illustrating one example of inspection processing that is executed by the inspection device 300 in FIG. 1. Hereinafter, the inspection processing is explained using respective components of the inspection device 300 in FIG. 1 and the flowchart in FIG. 4. Firstly, in the head part 100, the imaging processing part 131 controls the illuminating part 110 so as to emit structured light of white including a prescribed pattern (Step S1). Moreover, the imaging processing part 131 controls the imaging part 120 so as to image the measurement target S, in synchronization with the emission of the structured light at Step S1 (Step S2). Accordingly, the imaging part 120 generates pattern image data of the measurement target S.

Next, the imaging processing part 131 causes the storage part 133 to store therein the pattern image data generated at the previous Step S2 (Step S3). Moreover, the imaging processing part 131 determines whether imaging has been executed the prescribed number of times (Step S4). If the imaging has not been executed the prescribed number of times, the imaging processing part 131 controls the pattern generating part 118 in FIG. 2 so as to change the pattern of the structured light (Step S5), and causes the processing to return to Step S1. Here, changing the pattern of the structured light includes shifting a phase of the pattern of the structured light. Before the imaging has been executed the prescribed number of times, the processes at Steps S1 to S5 are repeated. Accordingly, a plurality of pieces of pattern image data when the measurement target S is successively irradiated by striped light and coded light while the pattern being changed are stored in the storage part 133. Note that, either of the striped light and the coded light may be emitted first.

If the imaging has been executed the prescribed number of times at Step S4, the image data generating part 132 generates height data, by performing a computation with respect to the plurality of pieces of pattern image data stored in the storage part 133 (Step S6). Thereafter, the output processing part 134 outputs the height data generated at Step S6 to the controller part 200 (Step S7). Accordingly, the height data is accumulated in the image memory 220 of the controller part 200.

Next, the imaging processing part 131 selects one light source among the plurality of the light sources 111, 112, and 113 in FIG. 2, and controls the illuminating part 110 so as to emit uniform light of the color corresponding to the selected one light source (Step S8). Moreover, the imaging processing part 131 controls the imaging part 120 so as to image the measurement target S, in synchronization with the emission of the uniform light at Step S8 (Step S9). Accordingly, the imaging part 120 generates texture image data of the color corresponding to the one light source.

Subsequently, the imaging processing part 131 causes the storage part 133 to store therein the texture image data generated at the previous Step S9 (Step S10). Moreover, the imaging processing part 131 determines whether imaging using all the light sources 111 to 113 has been executed (Step S11). If the imaging using all the light sources 111 to 113 has not been executed, the imaging processing part 131 determines a light source to emit light among one or the plurality of the light sources from which the light has not been emitted after the process at the previous Step S7 (Step S12), and returns the processing to Step S8. Before the imaging using all the light sources 111 to 113 has been executed, the processes at Steps S8 to S12 are repeated. Accordingly, a plurality of texture image data when the measurement target S is successively irradiated by uniform light while the color of the light with which the measurement target S is irradiated being changed are stored in the storage part 133.

If the imaging using all the light sources 111 to 113 has been executed at Step S11, the image data generating part 132 generates color texture image data by synthesizing the plurality of pieces of the texture image data stored in the storage part 133 (Step S13). Thereafter, the output processing part 134 outputs the color texture image data generated at Step S13, to the controller part 200 (Step S14). Accordingly, the color texture image data is accumulated in the image memory 220 of the controller part 200.

Next, in the controller part 200, the inspecting part 230 executes the image processing to the height data and the color texture image data accumulated in the image memory 220 at Steps S7 and S14 (Step S15). Accordingly, on the basis of the inspection content specified in advance by the user, the measurement for a predetermined portion in the height data or the color texture image data is executed. Specifically, the measurement related to the height direction (Z direction) is performed using the height data, and the measurement related to the X direction or the Y direction is performed using the color texture image data.

Subsequently, the inspecting part 230 determines, by comparing the measured value obtained at Step S15 with a prescribed threshold, the quality of the measurement target S (Step S16), and ends the measurement processing.

Here, the inspecting part 230 may display the determination result at Step S16 on the display part 320, or may provide it to the external device 400. Moreover, the inspecting part 230 can cause the display part 320 to display a height image based on the height data that is generated in the process at the abovementioned Step S6. In addition, the display part 320 can cause the display part 320 to display a color image of the measurement target S based on the color texture image data that is generated at the abovementioned Step S13.

In the abovementioned inspection processing, after the processes at Steps S1 to S7 have been executed, the processes at Steps S8 to S14 are executed, but the present invention is not limited thereto. The processes at Steps S1 to S7 may be executed after the processes at Steps S8 to S14 have been executed. Moreover, the processes at Step S7 and S14 may be executed at any time points before the measurement is executed, and may be concurrently executed with another process.

(5) Effect of Embodiment (a) In the abovementioned head part 100, the green light, the blue light, and the red light are emitted from the plurality of the light sources 111, 112, and 113, and white light is generated. The generated white light enters the pattern generating part 118, whereby the measurement target S is successively irradiated by a plurality of pieces of structured light to be generated. In this process, the imaging part 120 successively receives the plurality of pieces of the structured light reflected from the measurement target S, and a plurality of pieces of pattern image data are successively generated. Height data is generated on the basis of the generated plurality of pieces of the pattern image data.

Moreover, the green light, the blue light, and the red light are successively emitted from the plurality of the light sources 111, 112, and 113, and enter the pattern generating part 118. In this process, the pattern generating part 118 reflects the green light, the blue light, and the red light having been entered, whereby the measurement target S is successively irradiated by uniform light of the green light, uniform light of the blue light, and uniform light of the red light. The imaging part 120 successively receives the plurality of pieces of the uniform light reflected from the measurement target S, and a plurality of pieces of texture image data are successively generated. The generated plurality of pieces of the texture image data are synthesized, whereby color texture image data is generated. On the basis of the height data and the color texture image data, an inspection of measurement target S is executed.

In this case, the pattern generating part 118 and the imaging part 120 are commonly used in order to generate height data and color texture image data. Therefore, the configuration for generating height data and the configuration for generating color texture image data do not need to be individually prepared. Specifically, a light projection system that irradiates the measurement target S with structured light and a light projection system that irradiates the measurement target S with uniform light do not need to be individually prepared. Moreover, a light reception system that receives structured light reflected from the measurement target S and a light reception system that receives uniform light reflected from the measurement target S do not need to be individually prepared. This can reduce the number of components in the plurality of the light projection and reception systems for generating height data and color texture image data. This allows the reduction in size and the reduction in cost of the head part 100 of the inspection device 300.

(b) Moreover, with the abovementioned configuration, structured light that is used in the generation of height data and uniform light that is used in the generation of color texture image data progress in a common optical path, and are projected onto the measurement target S. An effect obtained from the above will be described.

Figure 5A:
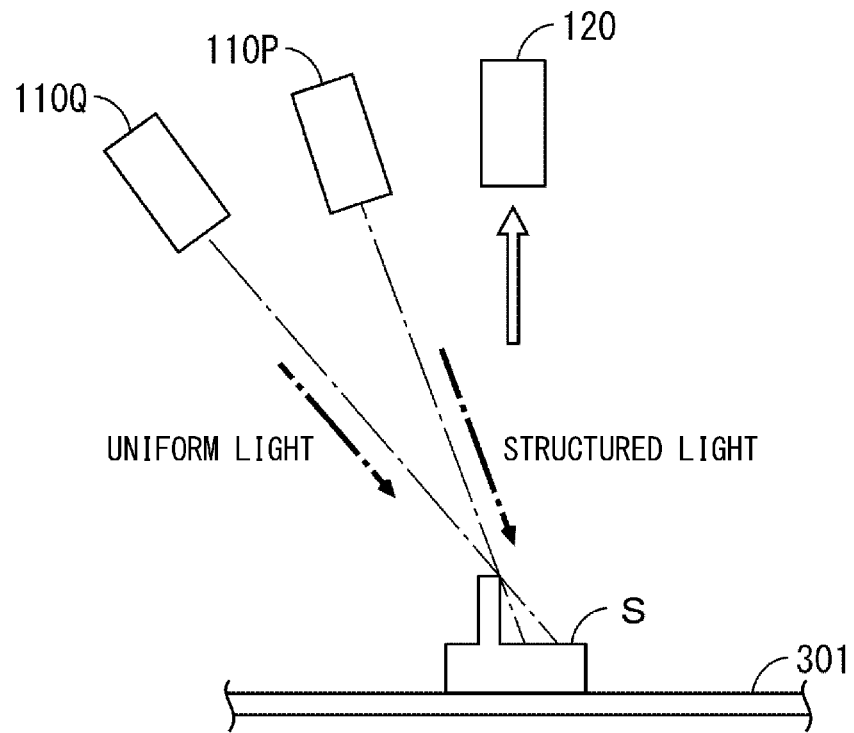
FIGS. 5A and 5B are diagrams for explaining a relation between an irradiation direction of structured light and irradiation direction of uniform light, and an unmeasurable region on a measurement target.
Figure 5B:
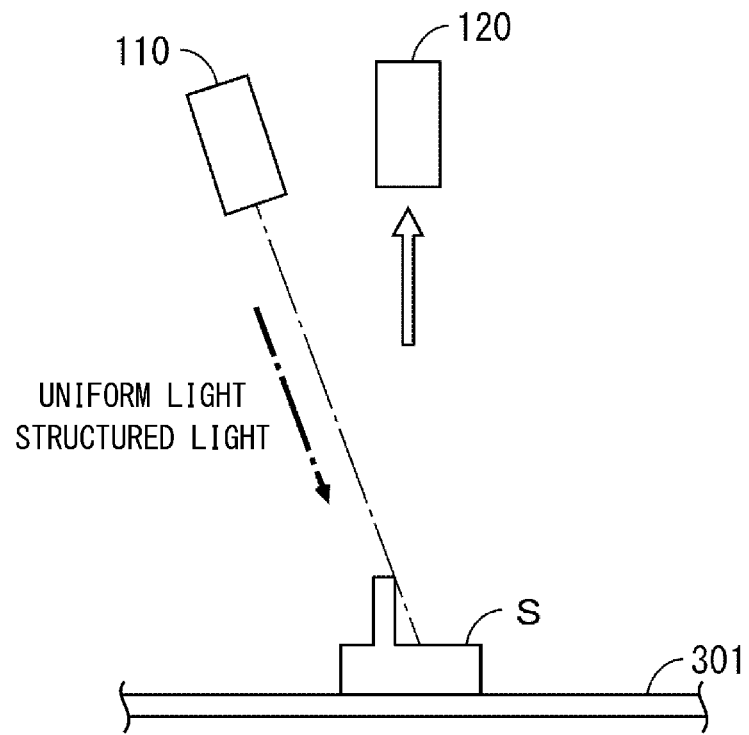

FIGS. 5A and 5B are diagrams for explaining a relation between an irradiation direction of structured light and an irradiation direction of uniform light, and an unmeasurable region on the measurement target S. FIG. 5A illustrates, as a reference example, an example of generating height data and texture image data individually using an illuminating part 110P that irradiates the measurement target S with structured light, and an illuminating part 110Q that irradiates the measurement target S with uniform light.

In the example of FIG. 5A, in order to prevent the illuminating parts 110P and 110Q and the imaging part 120 from interfering with each other, the illuminating parts 110P and 110Q and the imaging part 120 are disposed so as to align in the horizontal direction. With such a configuration, depending on the shape of the measurement target S, a region of a shadow to be formed on the measurement target S differs between a case where structured light is projected with respect to the measurement target S and a case where uniform light is projected with respect to the measurement target S. In this case, an unmeasurable region in the height data does not match with an unmeasurable region in the color texture image data.

FIG. 5B illustrates an example of generating height data and texture image data using the illuminating part 110 that selectively irradiates the measurement target S with structured light and uniform light, in the inspection device 300 according to the present embodiment. As illustrated in FIG. 5B, with the illuminating part 110 according to the present embodiment, the configurations of respectively applying structured light and uniform light to the measurement target S are made to be common. Therefore, irradiation directions of the structured light and the uniform light with respect to the measurement target S are coincident with each other. With such a configuration, independent of the shape of the measurement target S, regions of shadows to be formed on the measurement target S match with each other between a case where structured light is projected with respect to the measurement target S and a case where uniform light is projected with respect to the measurement target S. Accordingly, the unmeasurable region in the height data and the unmeasurable region in the color texture image data are maintained while being matched with each other. As a result, on the basis of the height data and the color texture image data, it is possible to easily grasp accurate information on the shape and the surface state of the measurement target S.

(c) In the abovementioned illuminating part 110, when height data is generated, structured light of white light is projected onto the measurement target S.

Depending on the color of the measurement target S, if light having a specified wavelength is projected onto the measurement target S, the projected light is absorbed on a surface of the measurement target S in some cases. In this case, even if the structured light having a specified wavelength is projected onto the measurement target S, there is a possibility that height data is not acquired due to the small amount of structured light that is reflected in the measurement target S.

With the abovementioned configuration, when height data is generated, the plurality of pieces of the structured light of white light including components of a plurality of wavelengths are projected onto the measurement target S. Therefore, independent of the color of the measurement target S, at least a part of the components of the wavelength can be reflected on the surface of the measurement target S. As a result, a range on the measurement target S on which the height data can be generated is enlarged.

(d) In the abovementioned head part 100, a plurality of light projection and reception systems for height data and color texture image data are compactly accommodated inside the head casing 100c. This can downsize the head part 100, and can reduce an installation space for the head part 100. In addition, the handling such as the installation of the head part 100 becomes easy.

(6) Preferable Positional Relationship between Pattern Generating Part 118 and Light Projection Lens 119

In the following explanation, in a state where no measurement target S is placed on the top surface of the belt conveyor 301, a region on the top surface of the belt conveyor 301 that is irradiated by structured light or uniform light from the illuminating part 110 is referred to as an irradiation region.

In the head part 100, in order to perform a shape measurement using the triangulation method, the optical axis ax1 of the illuminating part 110 is inclined with respect to the optical axis ax0 of the imaging part 120. In such as configuration, when focal point surfaces on an image side and an object side of the light projection lens 119 are orthogonal to the optical axis ax1, it is impossible to focus the focal point of the whole light generation surface of the pattern generating part 118 onto the top surface of the belt conveyor 301.

Therefore, in the abovementioned head part 100, the pattern generating part 118 and the light projection lens 119 may preferably be disposed relative to the top surface of the belt conveyor 301 on which the measurement target S is placed in accordance with a Scheimpflug principle.

Figure 6:
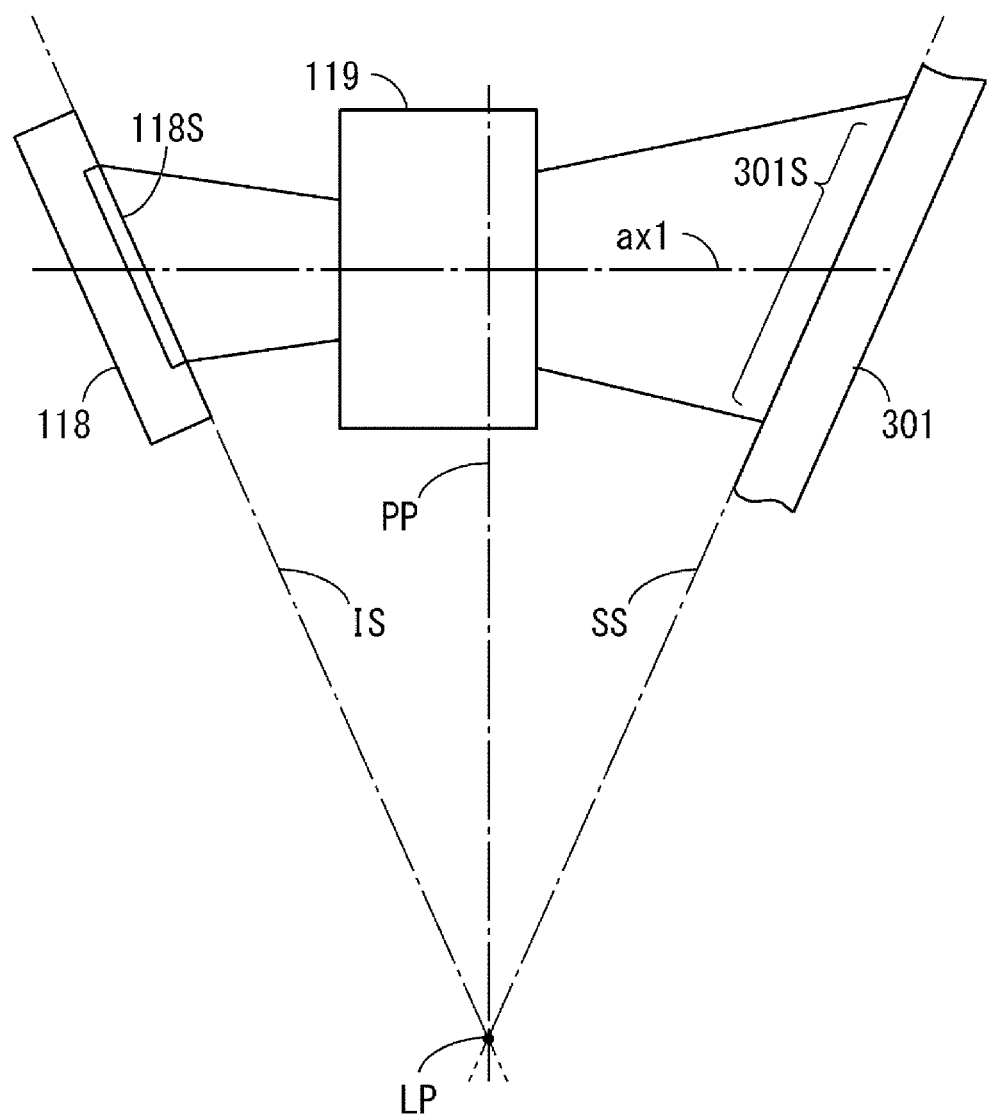
FIG. 6 is a diagram illustrating a preferable positional relationship between a pattern generating part and a light projection lens.

FIG. 6 is a diagram illustrating a preferable positional relationship between the pattern generating part 118 and the light projection lens 119. In the example of FIG. 6, the arrangement of a light generation surface 118S of the pattern generating part 118, the light projection lens 119, and the top surface of the belt conveyor 301 is determined in accordance with the Scheimpflug principle.

Specifically, the pattern generating part 118 and the light projection lens 119 are disposed such that a surface PP including a principal plane of the light projection lens 119, a surface IS including the light generation surface 118S of the pattern generating part 118, and a surface SS including the top surface of the belt conveyor 301 are mutually intersect on a common straight line LP.

When the light generation surface 118S is included in the focal point surface on the image side of the light projection lens 119, and the top surface of the belt conveyor 301 is included in the focal point surface on the object side of the light projection lens 119, the focal point of the entire light generation surface 118S is focused on an irradiation region 301S on the top surface of the belt conveyor 301. Accordingly, even when the light projection lens 119 has a small f value, the focal point of the entire light generation surface 118S is focused on the irradiation region 301S, so that it is possible to design the illumination to be brighter.

Figure 7:
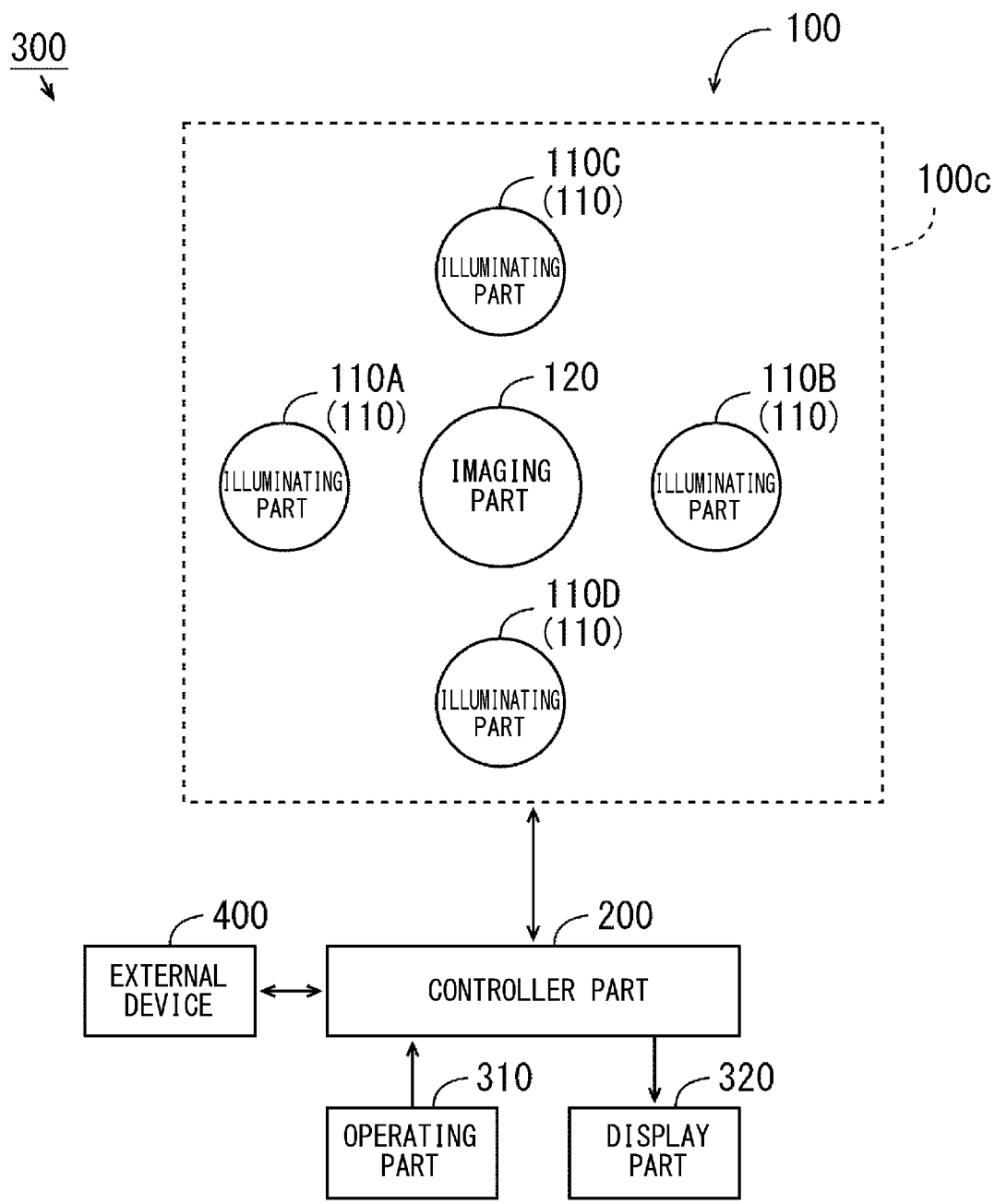
FIG. 7 is a block diagram illustrating a configuration of the inspection device according to a first modification example.

(7) Modification Examples (a) The head part 100 includes one illuminating part 110 and one imaging part 120, but the present invention is not limited thereto. FIG. 7 is a block diagram illustrating a configuration of the inspection device 300 according to a first modification example. As illustrated in FIG. 7, the head part 100 in the first modification example includes four illuminating parts 110. Note that, in FIG. 7, the illustration of the computing part 130 is omitted.

In the following explanation, when the four illuminating parts 110 are distinguished from one another, the four illuminating parts 110 are respectively referred to as illuminating parts 110A to 110D. The illuminating parts 110A to 110D mutually have the same structure, and are provided so as to surround the imaging part 120 at intervals of 90 degrees. Specifically, the illuminating part 110A and the illuminating part 110B are disposed so as to face each other by sandwiching the imaging part 120 therebetween. Moreover, the illuminating part 110C and the illuminating part 110D are disposed so as to face each other by sandwiching the imaging part 120 therebetween. In addition, the four illuminating parts 110A to 110D and the imaging part 120 are accommodated inside the head casing 100c, together with the computing part 130.

In this configuration, the four illuminating parts 110A to 110D can emit light with respect to the measurement target S from mutually different four directions. Accordingly, even when an unmeasurable portion by the light that is emitted from any one of the illuminating parts 110 is present, a shape of the unmeasurable portion can be measured by the light that is emitted from another illuminating part 110. Therefore, by synthesizing height data corresponding to each of the four illuminating parts 110A to 110D, it is possible to generate synthesized height data with the further reduced unmeasurable portion. Moreover, by synthesizing color texture image data generated corresponding to each of the four illuminating parts 110A to 110D, it is possible to generate color texture image data with the further reduced unmeasurable portion.

(b) In the abovementioned head part 100, the optical axis ax0 of the imaging part 120 extends in the up-and-down direction, and the optical axis ax1 of the illuminating part 110 is inclined with respect to the optical axis ax0, but the present invention is not limited thereto. The head part 100 may be configured such that a positional relationship between the illuminating part 110 and the imaging part 120 is the reverse of that in the abovementioned example. In other words, the head part 100 may be configured such that the optical axis ax1 of the illuminating part 110 extends in the up-and-down direction, and the optical axis ax0 of the imaging part 120 is inclined with respect to the optical axis ax1.

Figure 8:
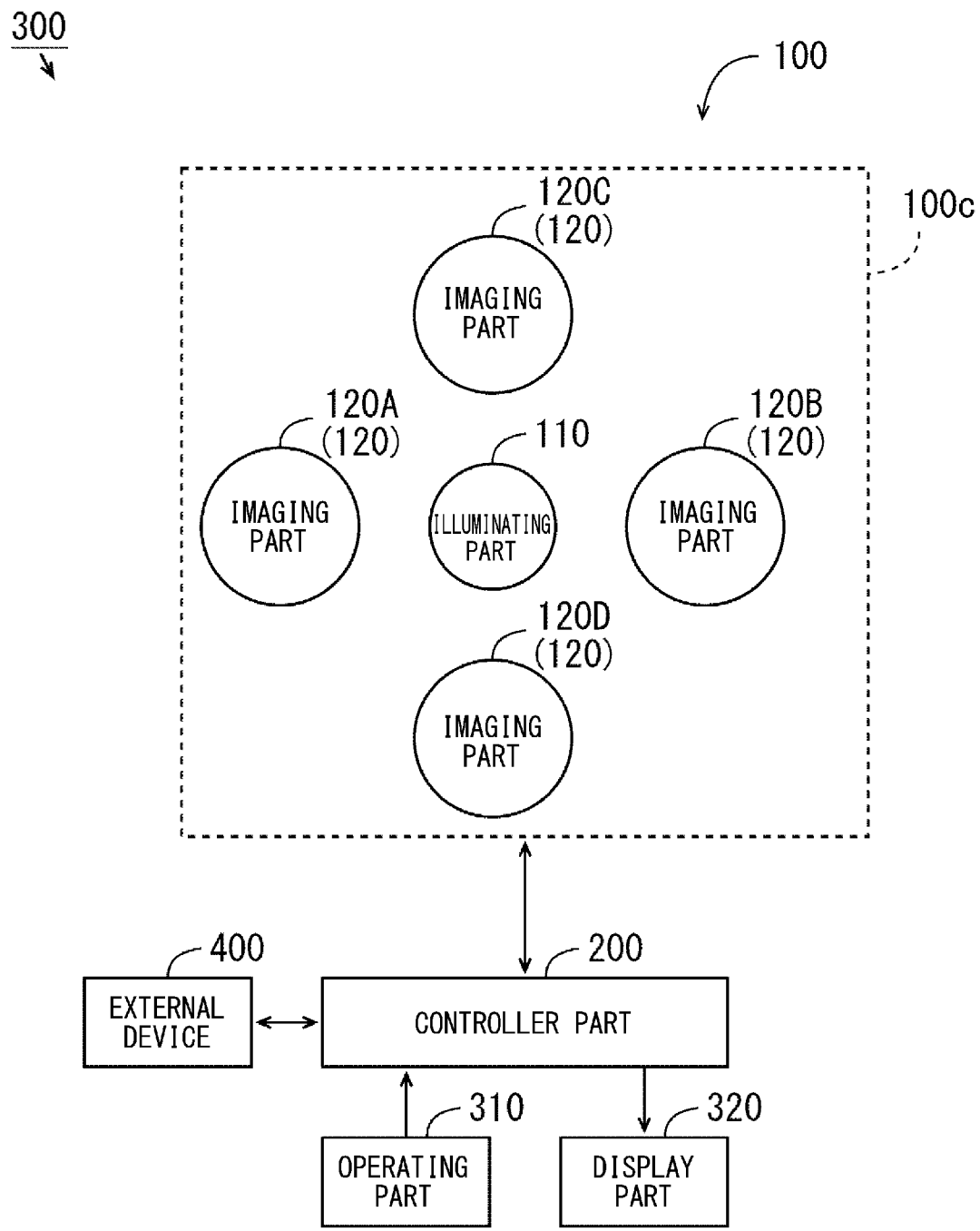
FIG. 8 is a block diagram illustrating a configuration of the inspection device according to a second modification example.

Moreover, in this case, a plurality of the imaging parts 120 may be provided with respect to one illuminating part 110. FIG. 8 is a block diagram illustrating a configuration of the inspection device 300 according to a second modification example. As illustrated in FIG. 8, the head part 100 in the second modification example includes four imaging parts 120. Note that, in FIG. 8, the illustration of the computing part 130 is omitted.

In the following explanation, when the four imaging parts 120 are distinguished, the four imaging parts 120 are respectively referred to as imaging parts 120A to 120D. The imaging parts 120A to 120D mutually have the same structure, and are provided so as to surround the illuminating part 110 at intervals of 90 degrees. Specifically, the imaging part 120A and the imaging part 120B are disposed so as to face each other by sandwiching the illuminating part 110 therebetween. Moreover, the imaging part 120C and the imaging part 120D are disposed so as to face each other by sandwiching the illuminating part 110 therebetween. In addition, the four imaging parts 120A to 120D and the illuminating part 110 are accommodated inside the head casing 100c, together with the computing part 130.

In this configuration, the four imaging parts 120A to 120D can image the measurement target S from mutually different four directions. Accordingly, even when a portion that cannot be imaged by any one of the imaging parts 120 is present, the portion that cannot be imaged can be imaged by another imaging part 120. Therefore, by synthesizing height data corresponding to each of the four imaging parts 120A to 120D, it is possible to generate synthesized height data with the further reduced unmeasurable portion. Moreover, by synthesizing color texture image data corresponding to each of the four imaging parts 120A to 120D, it is possible to generate synthesized color texture image data with the further reduced unmeasurable portion.

(8) Other Embodiments (a) In the abovementioned embodiment, in order to generate height data, structured light of white is projected onto the measurement target S, but the present invention is not limited thereto. Structured light for generating height data is not limited to structured light of white, but structured light of red, blue, green colors, or a combination of the two colors among the colors may be used. In this case, the color of structured light may be selectable by a user. This allows the user to inspect the height of the measurement target S using light having a suitable wavelength, in accordance with the color, the surface state, the shape, and the like of the measurement target S.

In this manner, when the color of structured light is selectable, the calibration of the inspection device 300 may preferably be performed in accordance with the selected color. This makes it possible to generate height data from which an influence such as chromatic aberration is removed.

(b) In the illuminating part 110 according to the abovementioned embodiment, the optical path common to the light sources 111, 112, and 113 are bent by the mirror 117 and the pattern generating part 118, but the present invention is not limited thereto.

The optical path common to the light sources 111, 112, and 113 may linearly extend without being bent. In this case, the mirror 117 becomes unnecessary from the abovementioned illuminating part 110. Moreover, in this case, a transmissive element such as an LCD is used as the pattern generating part 118. This simplifies the structure of the illuminating part 110.

(9) Correspondence Relation between Each Component in Claims and Each Unit in Embodiments Hereinafter, a correspondence relation between each component in claims and each unit in embodiments is explained. In the abovementioned embodiment, the measurement target S is an example of the measurement target, the light sources 111, 112, and 113 are examples of the plurality of the light sources, the pattern generating part 118 is an example of the pattern generating part, the imaging processing part 131 is an example of the light projection control part, the imaging part 120 is an example of the imaging part, the image data generating part 132 is an example of the image data generating part, the inspecting part 230 is an example of the inspecting part, and the inspection device 300 is an example of the inspection device.

Moreover, the light reception lenses 122 and 123 are examples of the light reception lens and the light reception optical system, the first holding member 110a is an example of the holding member, the mirror 117 is an example of the reflecting member, the light generation surface 118S of the pattern generating part 118 is an example of the light generation surface, the light projection lens 119 is an example of the light projection lens and the light projection optical system, the top surface of the belt conveyor 301 is an example of the placement surface, and the head casing 100c is an example of the casing.

As respective components in claims, other various elements having the configurations or the functions described in claims can also be used.

What is claimed is:

1. An inspection device comprising:
   a plurality of light sources configured to be provided so as to respectively emit a plurality of pieces of light having mutually different wavelengths, and so as to cause the emitted plurality of pieces of the light to progress in a preset common optical path;
   a pattern generating part that is provided on the common optical path, and configured to receive the light progressing in the common optical path, and selectively generate structured light and uniform light on the basis of the received light so as to cause the generated structured light or uniform light to progress in the common optical path, and to be projected onto a measurement target;
   a light projection control part configured to cause light to emit from at least one light source among the plurality of the light sources, control the plurality of the light sources and the pattern generating part so as to generate a plurality of pieces of the structured light while shifting a phase using the light emitted from the at least one light source, and control the plurality of the light sources and the pattern generating part so as to successively generate a plurality of pieces of the uniform light respectively having the plurality of the wavelengths from the plurality of the light sources;
   an imaging part configured to successively generate, by successively receiving the plurality of pieces of the structured light reflected from the measurement target, a plurality of pieces of pattern image data indicating an image of the measurement target, and successively generate, by successively receiving the plurality of pieces of the uniform light reflected from the measurement target, a plurality of pieces of texture image data indicating the image of the measurement target;
   an image data generating part configured to generate, on the basis of the plurality of pieces of the pattern image data, height data indicating a height image of the measurement target, and generate, by synthesizing the plurality of pieces of the texture image data, color texture image data indicating the image of the measurement target with a plurality of colors corresponding to the plurality of wavelengths; and
   an inspecting part configured to execute, on the basis of the height data and the color texture image data, an inspection of the measurement target, wherein
   the plurality of the light sources include the light source that emits green light, the light source that emits blue light, and the light source that emits red light, and
   the light projection control part controls the plurality of the light sources and the pattern generating part so as to cause the green light, the blue light, and the red light to be emitted from the plurality of the light sources, and to generate the plurality of pieces of the structured light while shifting a phase using white light that is obtained from the green light, the blue light, and the red light having been emitted.

2. The inspection device according to claim 1, further comprising:
   a light reception optical system configured to include a light reception lens having an optical axis that extends in an up-and-down direction, and guides structured light or uniform light that is reflected upward from the measurement target, to the imaging part;
   a holding member configured to hold the plurality of the light sources so as to cause the plurality of pieces of the light that are respectively emitted from the plurality of the light sources to progress in the common optical path from an upward direction to a downward direction; and
   a reflecting member configured to reflect the plurality of pieces of the light that are respectively emitted from the plurality of the light sources and progress from the upward direction to the downward direction, in an obliquely upward direction, so as to move away from the optical axis of the light reception lens, wherein
   the pattern generating part includes a light generation surface that selectively generates structured light and uniform light, by reflecting at least a part of the plurality of pieces of the light reflected by the reflecting member in an obliquely downward direction so as to come closer to the optical axis of the light reception lens.

3. The inspection device according to claim 2, further comprising a light projection optical system configured to include a light projection lens having an optical axis that extends obliquely downward so as to come closer to the optical axis of the light reception lens, and guides the structured light or the uniform light generated with the light generation surface, to the measurement target, wherein
   the measurement target is placed on a preset placement surface, and
   the pattern generating part and the light projection optical system are arranged so as to cause the light generation surface of the pattern generating part and the placement surface to follow a Scheimpflug principle, relative to a principal plane of the light projection optical system.

4. The inspection device according to claim 3, further comprising a casing configured to accommodate the plurality of the light sources, the holding member, the reflecting member, the pattern generating part, the light projection optical system, the light reception optical system, and the imaging part.

* * * * *